United States Patent [19]
Srinivasan

[11] 4,064,763
[45] Dec. 27, 1977

[54] ACCELEROMETER FOR MEASURING PUMP ROD DISPLACEMENT

[75] Inventor: Krishnaswamy Srinivasan, Houston, Tex.

[73] Assignee: Shell Oil Company, Houston, Tex.

[21] Appl. No.: 737,306

[22] Filed: Nov. 1, 1976

[51] Int. Cl.² ............................................. G01P 15/12
[52] U.S. Cl. ................................................. 73/516 R
[58] Field of Search ......... 73/516 R, 517 R, 516 LM, 73/514, 88.5 SD, 490, 71.2; 338/5, 6, 43

[56] References Cited
U.S. PATENT DOCUMENTS

| | | | |
|---|---|---|---|
| 3,251,222 | 5/1966 | Fenner | 73/88.5 SD |
| 3,303,452 | 2/1967 | Booth | 338/5 |
| 3,354,725 | 11/1967 | Canfield | 73/516 LM |
| 3,417,626 | 12/1968 | Riordan | 73/516 R |
| 3,646,818 | 3/1972 | Little et al. | 73/517 R |
| 3,828,294 | 8/1974 | Baba et al. | 338/43 |

Primary Examiner—James J. Gill

[57] ABSTRACT

A strain gage accelerometer having a large mass suspended by thin support plates with strain gages disposed on the support plates and connected to maximize response along one axis while minimizing response along directions at right angles to the first axis.

8 Claims, 3 Drawing Figures

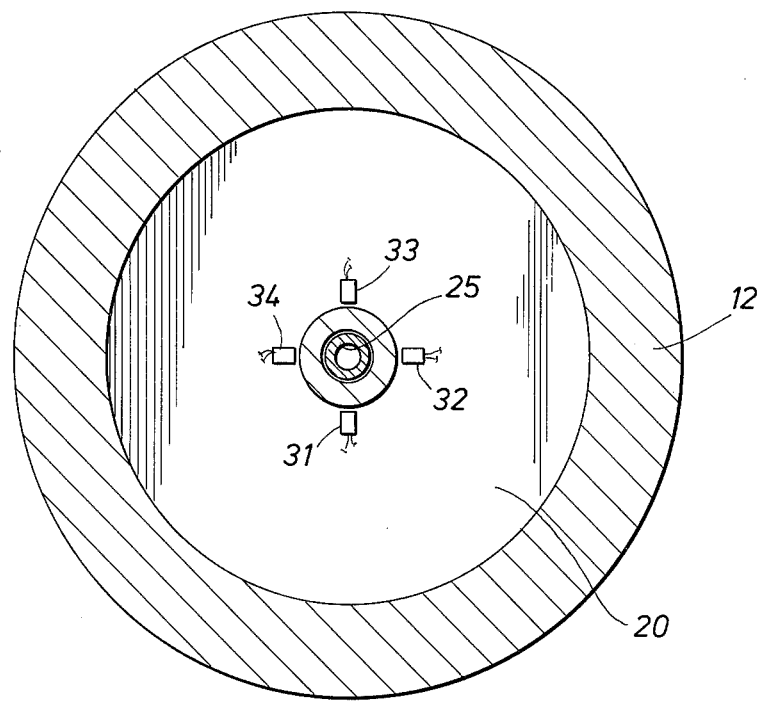
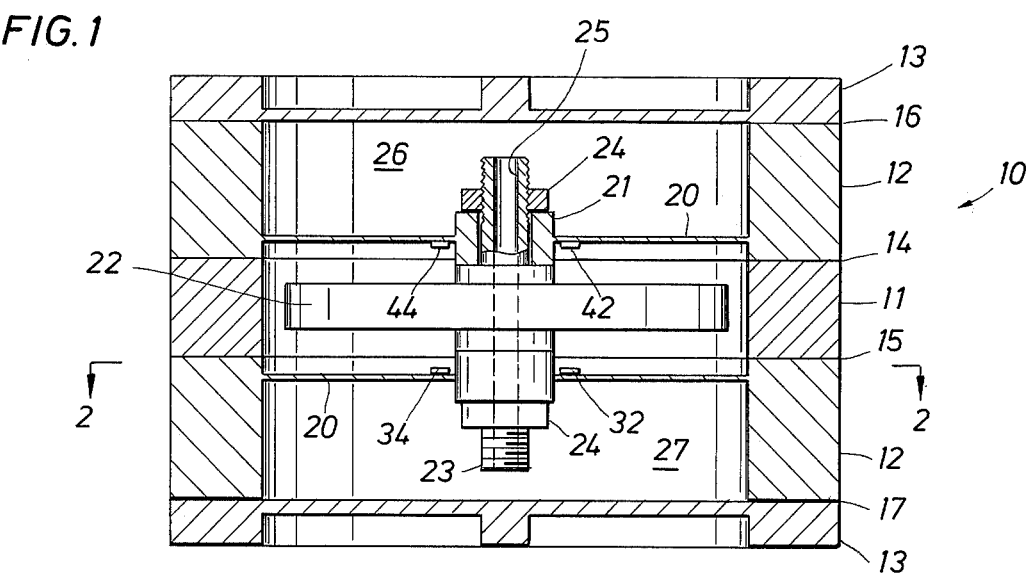
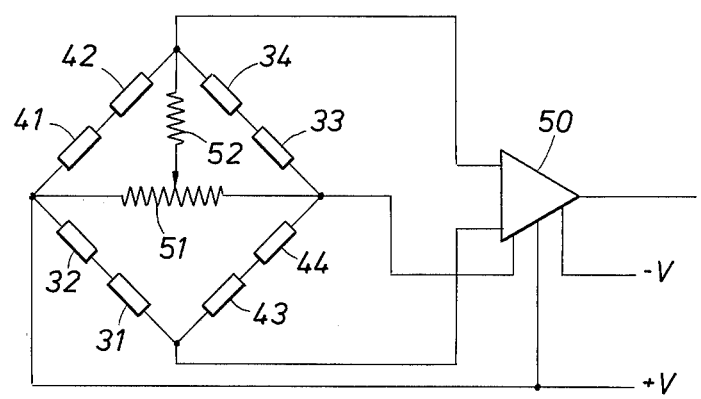

ACCELEROMETER FOR MEASURING PUMP ROD DISPLACEMENT

BACKGROUND OF THE INVENTION

The present invention relates to equipment for monitoring rod pumped oil wells and more particularly to an accelerometer for measuring the acceleration of the rod string. Many oil wells require some means of artificial lift for producing the oil after the initial water or gas drive has been depleted. A conventional method for artificially lifting such wells is the use of a conventional piston pump disposed at the bottom of the well. The pump is reciprocated by a string of rods which extend to the surface where they are reciprocated by a beam pumping unit. In order to ensure efficient operation of beam pumping units, it is necessary to periodically measure the energy input to the pump and compute its performance. The energy input to pump can be calculated by measuring both the load on the rod string and the displacement of the rod string. Using these figures and following the teachings of U.S. Pat. No. 3,343,409 one can determine the shape of the dynamometer card for the downhole pump. The shape of the dynamometer card will indicate the operating condition of the downhole pump.

A recently issued U.S. Pat. No. 3,951,209 describes a method for determining when a rod pumped well is pumped-off by measuring the load on the rod and displacement of the rod. This permits one to determine when the well has pumped-off and thus shut in the pump until additional fluid accumulates in the well. The term "pumped-off" is used to describe the condition wherein the bottom-hole pump does not completely fill with liquid on the upstroke and on the succeeding down-stroke the rod string falls free until the pump contacts the fluid. The free falling of the rod string and the sudden contacting of the fluid produces shock loads in the rod string which can damage both the downhole pump unit and the beam pumping unit at the surface. In addition, the operation of the pump in a pump-off condition is inefficient and wastes energy. For efficient operation the pumping unit should be stopped when the well is pumped-off and fluid allowed to accumulate in the well before restarting the pumping unit. Thus, using continuous monitoring equipment one can adjust the duty cycle of the pump to match the production of the well. This will result in both the maximum production and the lowest power consumption for operating the pumping unit.

The present monitoring systems use load cells for measuring the force on the rod and variable potentiometers to measure the displacement of the beam of the pumping unit or of the polished rod. The displacement of the beam of the pumping unit can, of course, be related to actual displacement of the rod string. The use of a variable potentiometer requires the movable arm to be aligned with and physically connected to the beam of the pumping unit or to the polished rod. Thus, the potentiometer cannot be completely sealed and the unit is open to atmospheric conditions. In addition, the continuous wiping movement of the arm across the potentiometer causes wear that necessitates their frequent replacement.

BRIEF DESCRIPTION OF THE INVENTION

The present invention solves the above problems by providing an accelerometer which is specifically designed to measure the slow accelerations of the polished rod. It is well known that the double integration of the acceleration signal will provide the displacement signal. The accelerometer is specifically designed to measure the extremely low frequencies and the low amplitudes of acceleration that occurs in a rod pumping unit. The frequencies of acceleration to be measured are less than 2Hz and their amplitudes are within one gravity. Further, the accelerometer utilizes strain gages which are disposed so that only the acceleration along its longitudinal axis is measured while discriminating against transverse motion.

The accelerometer utilizes two diaphragms for supporting a relatively large mass to measure the low frequencies. When compared with the normal pumping loads, the mechanical loading of the pumping unit by the heavy accelerometer is negligible. The diaphragms are formed integral with the housing so that motion of the large mass is not absorbed by the means used for clamping the outer edge of the diaphragms. Further, four metal foil strain gages are mounted on each diaphragm with two adjacent strain gages being coupled in series to form one leg of a bridge while the remaining strain gages on the diaphragm are coupled in series to form the opposite leg of the bridge. The four strain gages on the second diaphragm are coupled in a similar manner to form the remaining two legs of a Wheatstone bridge. The combination of relatively stiff diaphragms, formed integral with the housing and the disposition of the strain gages, produces an accelerometer, the response of which is sensitive to acceleration along its longitudal axis and insensitive to accelerations transverse to this axis.

BRIEF DESCRIPTION OF THE DRAWING

The present invention will be more easily understood from the following detailed description of a preferred embodiment when taken in conjunction with the attached drawings in which:

FIG. 1 is a vertical section of the accelerometer constructed according to this invention;

FIG. 2 is a horizontal section taken along line 22 of FIG. 1; and

FIG. 3 is a circuit diagram of the accelerometer.

PREFERRED EMBODIMENT

Referring to FIGS. 1 and 2 there is shown an accelerometer having a cylindrical housing 10 which is closed at each end. The housing is formed from a cylindrical center section 11 and two identical diaphragm sections 12 while end caps 13 are provided for closing the ends of the cylindrical housing. The sections of the cylindrical housing are secured together by screws. In addition, the surfaces 14, 15, 16 and 17 between the various sections of the housing should be provided with suitable sealing material so that the completed housing is leak proof.

The diaphragms 20 which support the mass 22 of the accelerometer are formed integral with the diaphragm sections 12 of the housing. The diaphragms are 0.04 inches thick and have a diameter of 5 inches. The suspended mass has a weight of approximately 2.7 pounds and the natural frequency of vibration of the system is about 20 Hz. Since the accelerometer is used to measure low frequency accelerations any movement between the outer edge of the diaphragm and the mounting will reduce or distort the amplitude of the acceleration signal. By forming the diaphragm integral with the diaphragm section 12 the possibility of movement between the outer edge of the diaphragm and the means used for clamping it is eliminated. The diaphragms are provided with bosses 21 at the center which are formed integrally with the diaphragms and are used for supporting the acceleration mass 22. The diaphragms and the mass are clamped together as a unit by means of a tubular stud 23 which passes through the bosses on the diaphragms and is secured in place by nuts 24 at opposite ends. In addition, the tubular stud is provided with a central opening 25 to provide free fluid communication between the spaces 26 and 27 on opposite sides of the mass 22. The spaces 26 and 27 may be filled with a suitable fluid, i.e., silicone fluid, to provide additional dampening of the motion of the suspended mass.

The metal foil strain gages 31-34 and 41-44 are attached to the surface of the diaphragm 20 which are adjacent to the mass 22. This ensures that the strain gages are not exposed to the damping fluid used. Referring now to FIG. 2, four strain gages are shown mounted on the lower diaphragm 20, with the strain gages being arranged radially with a 90° interval between adjacent strain gages. Four similar strain gages 41-44 are attached to the upper diaphragm, two of which 42 and 44 are shown in FIG. 1. The metal foil strain gages used have a gage factor of approximately 2.

The strain gages are coupled in series to form a Wheatstone bridge, as shown in FIG. 3. In particular, the adjacent strain gages 31 and 32 form one leg of the bridge circuit while the other strain gages 33 and 34 on the lower diaphragm form the opposite leg. The remaining two legs of the bridge are formed by the four strain gages 41-44 on the upper diaphragm, as shown. In addition, a variable resistor 51 is coupled between two corners of the bridge while a fixed resistance 52 is coupled between one of the remaining corners and the wiper of the variable resistance 51 for balancing the bridge under zero conditions. The bridge is powered from a regulated ± 15V DC power supply indicated as +V and a −V in the figure. Similarly, the output of the bridge is taken from the remaining two corners and supplied to a differential input instrumentation amplifier 50.

From the above description it can be seen that the accelerometer is provided with features which permit it to measure relatively low frequencies of acceleration. It is also sensitive to acceleration along its longitudinal axis while discriminating against acceleration transverse to its longitudinal axis. This performance is obtained by using identical diaphragms for supporting the mass of the accelerometer and firmly anchoring the periphery of the diaphragms. In addition, by placing the strain gages radially at 90° intervals and coupling them as shown in FIG. 3, the response of the accelerometer to transverse accelerations is substantially eliminated. Thus, the accelerometer will be capable of measuring the low level, low frequency accelerations that occur in the rod string of a beam pumped well in the presence of transverse accelerations.

Semiconductor strain gages can be used instead of the metal foil strain gages. The sensitivity of the accelerometer would be higher. Therefore, the gain of the instrumentation amplifier may be decreased by at least an order of magnitude. However, the accelerometer output would be more sensitive to temperature variations. If the acceleration data can be processed to disseminate against the resulting variations, this would be a feasible construction of the accelerometer.

Also, the damping fluid may be replaced by other forms of adding damping to the vibrating system. Compliant solid material may be interposed between the diaphragms and the end caps of the accelerometer. The resulting accelerometer would be easier to assemble.

What is claimed is:

1. An accelerometer for measuring low amplitude, low frequency accelerations along one axis and discriminating against acceleration along axes at right angles to said one axis; said accelerometer comprising:
    a closed cylindrical housing;
    a pair of spaced circular diaphragms, said diaphragms being mounted in said housing in a spaced parallel relation to divide said housing into three enclosed spaces within said housing;
    a weighted member, said member being disposed in the space between said diaphragms and fastened to both said diaphragms;
    conduit means disposed to provide fluid communication between the other two spaces;
    a plurality of strain gages, at least one of said strain gages being mounted on each of said diaphragms with their sensitive axis disposed in a radial direction; and
    circuit means, said strain gages being coupled to said circuit means in a manner to cancel response along axes transverse to the axis of said cylindrical housing.

2. The accelerometer of claim 1 wherein four strain gages are mounted on each diaphragm, said strain gages being disposed radially at 90° intervals.

3. The accelerometer of claim 2 wherein said strain gages are coupled in a bridge circuit.

4. The accelerometer of claim 3 wherein two adjacent strain gages on one diaphragm are connected in series to form one leg of the bridge while the remaining two adjacent strain gages are connected in series to form the opposite leg of the bridge, the strain gages on the other diaphragm connected in the same order to form the remaining two legs of the bridge.

5. The accelerometer of claim 4 wherein said diaphragms are formed integral with said housing.

6. The accelerometer of claim 1 wherein said other two spaces are filled with a damping fluid.

7. The accelerometer of claim 1 wherein said closed cylindrical housing consists of a central cylindrical section, two identical diaphragm sections, and end caps for closing the end of each diaphragm section, all of said central section, diaphragm sections, and end caps being securely fastened together to form a closed housing.

8. The accelerometer of claim 7, and in addition, each of said diaphragm sections comprising an outer cylindrical portion with the diaphragm being formed integral with said cylindrical portion.

* * * * *